(12) United States Patent
Guthrie et al.

(10) Patent No.: US 6,729,821 B2
(45) Date of Patent: May 4, 2004

(54) EXPANSION BOLT

(76) Inventors: Karl Guthrie, 49 Cypree Fairway Village, Wimberley, TX (US) 78676; Joseph Schwartz, 28 West Inwood Forrest, Wimberley, TX (US) 78676

( * ) Notice: Subject to any disclaimer, the term of this patent is extended or adjusted under 35 U.S.C. 154(b) by 0 days.

(21) Appl. No.: 10/086,672

(22) Filed: Feb. 28, 2002

(65) Prior Publication Data

US 2002/0098054 A1 Jul. 25, 2002

(51) Int. Cl.[7] .................................................. F16B 13/04
(52) U.S. Cl. ........................ 411/80; 411/44; 248/231.9; 248/231.91; 248/925
(58) Field of Search ............................... 411/60.1, 60.3, 411/58, 54, 44, 24, 27, 75–80; 403/365–368, 371, 373, 374.1–374.4, 292, 294, 297, 286; 248/231.9, 231.91, 925

(56) References Cited

U.S. PATENT DOCUMENTS

| | | | |
|---|---|---|---|
| 1,469,666 A | * | 10/1923 | Pleister et al. .................. 411/24 |
| 2,896,494 A | * | 7/1959 | Lerick .......................... 411/76 |
| 3,021,745 A | * | 2/1962 | Liborn ......................... 411/76 |
| 3,042,094 A | * | 7/1962 | Liljeberg ..................... 411/271 |
| 3,352,193 A | * | 11/1967 | Lerich ......................... 411/79 |
| 3,478,641 A | | 11/1969 | Dohmeier |
| 3,903,785 A | | 9/1975 | Pepper, Jr. |
| 3,957,237 A | | 5/1976 | Campbell |
| 4,082,241 A | | 4/1978 | Burkey |
| 4,184,657 A | | 1/1980 | Jardine |
| 4,422,607 A | | 12/1983 | Vallance |
| 4,464,076 A | | 8/1984 | Leibhard |
| 4,572,464 A | | 2/1986 | Phillips |
| 4,607,992 A | | 8/1986 | Mauritz et al. |
| 4,611,963 A | | 9/1986 | Frohlich et al. |
| 4,643,378 A | | 2/1987 | Guthrie et al. |
| 4,715,568 A | | 12/1987 | Best, Jr. |
| 4,818,163 A | | 4/1989 | Bereiter et al. |
| 4,834,327 A | | 5/1989 | Byrne |
| 4,869,342 A | | 9/1989 | Borst |
| 5,042,888 A | | 8/1991 | Shinjo |
| 5,154,558 A | * | 10/1992 | McCallion .................... 411/54 |
| 5,161,916 A | * | 11/1992 | White et al. ............. 405/259.6 |
| 5,253,964 A | | 10/1993 | Swemmer |
| 5,344,252 A | * | 9/1994 | Kakimoto .................... 403/358 |
| 5,484,132 A | | 1/1996 | George et al. |
| 5,651,650 A | * | 7/1997 | Herb et al. ................... 411/78 |
| 6,092,773 A | * | 7/2000 | Kieliszewski ............ 248/231.9 |
| 6,109,578 A | | 8/2000 | Guthrie et al. |
| 6,299,397 B1 | * | 10/2001 | Mengel ........................ 411/24 |

* cited by examiner

*Primary Examiner*—Flemming Saether
*Assistant Examiner*—Jori Schiffman
(74) *Attorney, Agent, or Firm*—Birdwell & Janke, LLP

(57) ABSTRACT

An expansion bolt. In a preferred embodiment, the expansion bolt includes a center chock having either a convex or a concave outer ramping surface and two outer chocks disposed about the center chock having complementarily concave or convex outer ramping surfaces.

11 Claims, 2 Drawing Sheets

EXPANSION BOLT

BACKGROUND OF THE INVENTION

The present invention relates to an expansion bolt, particularly for use in engaging drilled holes. The application incorporates by reference herein in its entirety the inventors' U.S. Pat. No. 6,109,578, wherein a description of the related art as it concerns rock climbing is provided. The borehole-engaging apparatus of the '578 patent provides a number of advantages over the prior art, such as simple construction, reliable operation, greater standardization, which reduces the cost per unit and the amount of gear that a climber must purchase and carry, and robustness or insensitivity to rotational orientation about the apparatus' longitudinal axis. For many purposes, including rock climbing, it is particularly important that the expansion bolt be easily removable. The lack of this feature is exemplified by an embodiment of an anchoring device shown in FIG. 3 of Dohmieier, U.S. Pat. No. 3,478,641, which biases hole gripping dogs outwardly with a brindle which is not accessible for removing the device.

The novel expansion bolt of the present invention provides advantages similar to those of the '578 patent, as well as outstanding ease of insertion and removal, and hole-engaging or holding strength.

In addition to the problems associated with anchoring to rocks for rock climbing, the construction industry and providers of emergency services such as fire, police and rescue service often have the need for anchoring structures or devices for temporary use. For example, temporary shelter may be needed, and tents may need to be erected quickly in urban environments, i.e., on concrete or asphalt surfaces. To anchor the tent, weights such as sand bags or drums of water are typically employed. However, the use of weights poses a difficulty in obtaining and moving the material for the weights, or in obtaining and moving the weights themselves. These aspects of the use of weights as anchors as well as other aspects of the weights, such as the ready availability of sand or dirt in the urban environment, make it more difficult to move and erect the tent quickly.

In the construction industry, it is often imperative to provide fall protection for the workers. Typically, contractors build-in specialized harnessing hardware at predetermined locations on or in the structures as they are built. The harnessing hardware is specially adapted to accept inserts that are difficult to use because they tend to fill up with concrete. As the locations for the built-in hardware are predetermined, it may be determined later that they have not been placed precisely where they are needed, yet they will often be used anyway, posing risk of extreme injury or death. Moreover, as permanent or semi-permanent installations, they may be used by subcontractors or others when this is not anticipated or desired, so that the contractor assumes a risk of liability for injuries or deaths that result from the imprudent use of the harnessing hardware by others.

Also in the construction industry, there is often a need to move large objects or materials, such as boulders. Irregularly shaped objects such as boulders present particular difficulties in grasping; often chains must be wrapped around a boulder or other irregularly shaped object to secure it. Prefabricated structural materials, such as concrete facades, are typically provided with hardware for attaching chains or cables; however, these also may be found insufficient during actual construction.

There is also a need for retrofitting bridges and other structures with tying cables to increase earthquake resistance, and tying one or more large objects together. Presently, the cables are secured to hardware which is bolted to the structure with a number of bolts, requiring that a number of corresponding holes be drilled in the structure.

Emergency workers must sometimes assemble structures used for maneuvering in urban environments quickly, to respond to man-made and natural disasters. For example, emergency workers may need to climb the face of buildings, or provide hoists for elevating people and equipment, or anchor ladders to man-made structures such as brick or concrete-faced buildings as well as natural features such as rocks.

Accordingly, there is a need for an expansion bolt that provides a simple, reliable and relatively inexpensive means for connecting a cable, rope or wire to a drilled hole in a hard material, that is easy to install in and remove from the hole, and that effectively anchors to the hole while applying a minimum stress to the hole, while providing a minimum sensitivity to the angular orientation of the expansion bolt in the hole. There is more particularly a need to provide all of these features for use in a hole drilled in concrete or another hard but relatively brittle or weak material.

SUMMARY OF THE INVENTION

The expansion bolt of the present invention solves the aforementioned problems and meets the aforementioned needs by providing a first chock having first and second outer ramping surfaces, a second chock having an inner ramping surface complementarily corresponding to the first outer ramping surface and a first spring member for biasing the second chock radially inwardly toward the axis against the first outer ramping surface of the first chock.

Preferably, a third chock is provided having an inner ramping surface complementarily corresponding to the second outer ramping surface, along with a second spring member for biasing the third chock radially inwardly toward the axis against the second outer ramping surface of the first chock.

Preferably, the center chock is frustoconical and the ramping surface thereof is convex, and the outer chock has a complementary frustoconical ramping surface that is concave. Preferably, at least two outer chocks are azimuthally symmetrically disposed about the longitudinal axis.

Therefore, it is a principal object of the present invention to provide a novel and improved expansion bolt.

It is a further object of the present invention to provide an expansion bolt that provides a simple, reliable and relatively inexpensive means for connecting a cable, rope or wire to a hole drilled in a hard material.

It is still a further object of the present invention to provide an expansion bolt that facilitates insertion into the hole and removal from the hole.

It is yet a further object of the present invention to provide an expansion bolt that provides for effectively anchoring to the hole while applying a minimum stress to the hole.

It is another object of the present invention to provide an expansion bolt that provides minimum sensitivity to the angular orientation of the expansion bolt in the hole.

It is still another object of the present invention to provide an expansion bolt that provides for increased holding strength in holes drilled in relatively brittle or weak materials such as concrete and asphalt.

It is yet another object of the present invention to provide an expansion bolt for use in such materials that minimizes the stress placed on the material.

It is still a further object of the present invention to provide an expansion bolt for use in such materials that more uniformly distributes the stress placed on the material.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
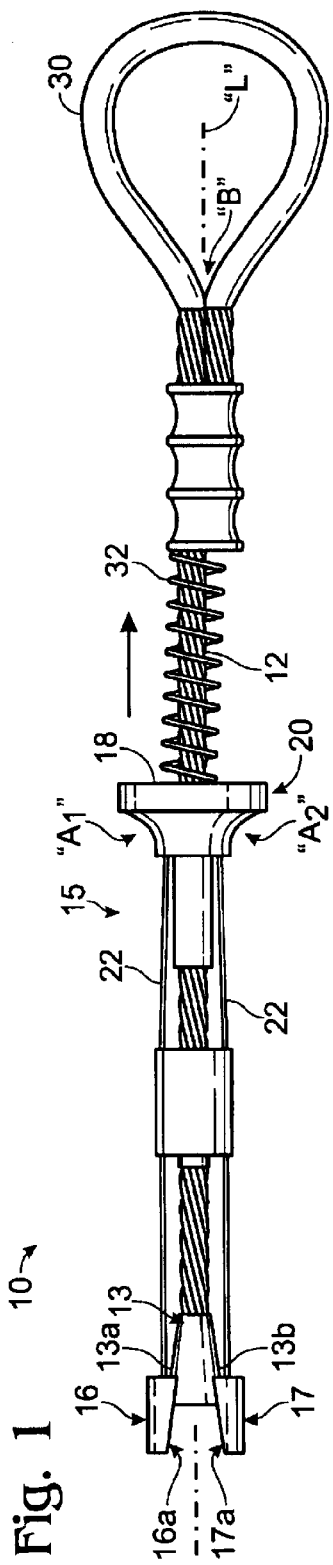
FIG. 1 is a pictorial elevational view of an expansion bolt according to the present invention.

Referring to FIG. 1, an expansion bolt 10 according to the present invention is shown. The expansion bolt 10 provides exceptional advantage for engaging cylindrical holes drilled or bored into concrete or other hard, but brittle or relatively weak material. However, the bolt 10 may be employed for engaging a hole of any shape, either specially provided or existing, in any solid material for any desired purpose without departing from the principles of the invention.

As is common in the art, the expansion bolt 10 includes a cable 12 having at a chock at a distal end thereof. According to the invention, a center chock 14 is provided having an outer surface 13 and a cooperating outer chock assembly 15 is provided to engage the center chock and to accommodate linear movement of the cable 12 along a longitudinal axis "L" with respect thereto. For example, the cable may be passed through a hole 18 in a collar 20 supporting the chock assembly 15.

The outer chock assembly 15 includes at least one outer chock, such as the outer chock referenced as 16, and preferably includes two or more outer chocks, such as the outer chocks referenced as 16 and 17. Each outer chock is preferably attached to the collar 20 through a respective elongate control cable or rod 22 that permits moving the outer chock upwardly along the longitudinal axis with respect to the inner chock by pushing upwardly on the collar 20.

The outer chocks 16 and 17 have inner surfaces 16a and 17a against which the outer surface 13 of the center chock 14 slides as a result of relative linear movement of the cable with respect to the collar 20. Particularly, when the collar 20 is pushed upwardly along the axis "L" in the direction of the arrow with respect to the cable, the outer chocks are forced radially outwardly, to provide an expanded configuration of the expansion bolt. When introduced into a hole, this outward expansion of the outer chocks is resisted by the inner surface of the hole, anchoring the expansion bolt in the hole. Conversely, when the collar is pulled downwardly with respect to the cable, the outer chocks are free to move inwardly toward the inner chock, or may be biased toward the inner chock by the respective control cables or rods 22, to provide a contracted configuration of the expansion bolt. This permits removing the expansion bolt from the hole.

Figure 2:
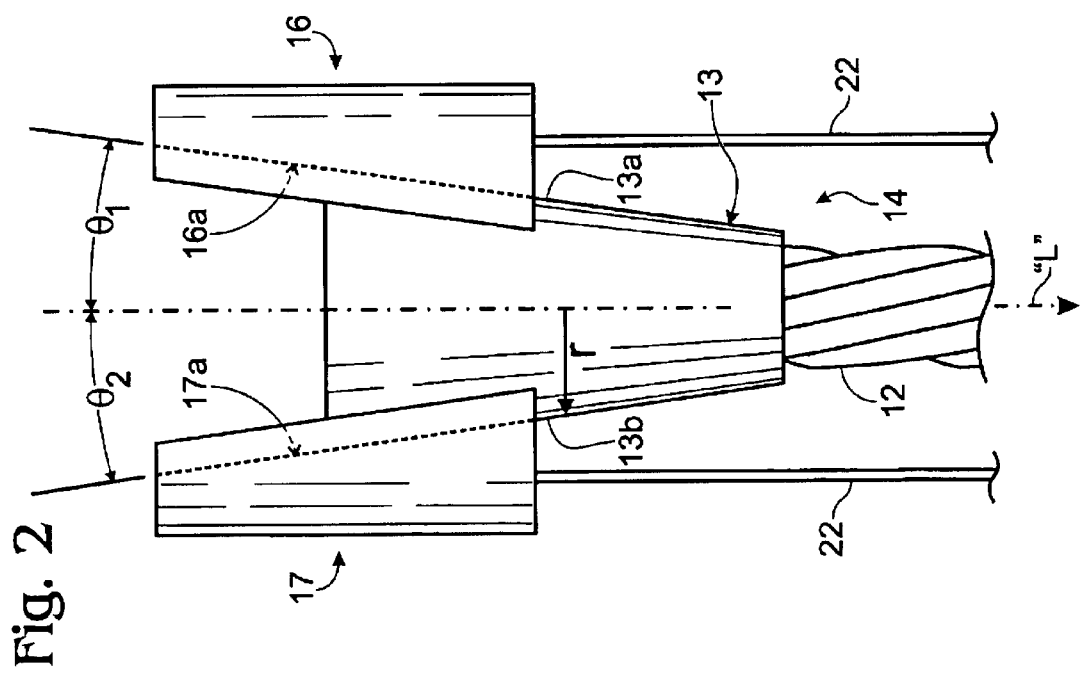
FIG. 2 is a broken detail of the expansion bolt of FIG. 1.

Referring to FIG. 2, to provide for this wedging action, a portion 13a of the outer surface 13 and the inner surface 16a, and a portion 13b of the outer surface 13 and the inner surface 17a, are cooperatively configured as ramping surfaces, i.e., each is inclined at non-zero angles $\theta$ with respect to the axis "L." The portions 13a and 13b are preferably identical portions of the surface 13 for use with identical outer chocks 16 and 17; however, this is not essential to the invention. The ramping surfaces may have any shape that functions as a ramp, including simple planar surfaces and more complex curvilinear surfaces that may include longitudinal grooves, splines or other surface features. In a preferred embodiment of the invention, all portions of the outer surface 13 of the center chock 14 are convex or concave, and the corresponding inner surfaces of the outer chocks are complementarily concave or convex.

For example, FIG. 1 shows a center chock 14 having a convex outer surface 13 including convex portions 13a and 13b, along with outer chocks 16 and 17 having complementary concave inner surfaces. Preferably, the surfaces 13, 16a and 17a are each rotationally symmetric about the longitudinal axis "L," and more preferably still, the surfaces of the center and outer chocks are complementarily frustoconically shaped. An example of complementarily frustoconically shaped center and outer chocks is shown in the Figures. Here, the center chock is shaped as a frustrum so that the surface 13 is convex and the outer chock surfaces 16a and 17a are concave and substantially conform to the frustrum. The reverse geometry may also be employed for this example, wherein the surfaces 16a and 17a are convex and shaped as portions of frustrums, and the center chock surface 13 is concave and substantially conforms to these portions. Moreover, the surfaces 13, 16a and 17a may include only portions that are complementarily frustoconical where desired.

The complementarily frustoconical shapes provide a preferred means for ensuring intimate conformance between the respective ramping surfaces of the center and outer chocks over a range of relative linear movement therebetween, wherein the force exerted between the chocks is distributed over a maximum surface area. This increases reliability by decreasing stress and wear, as well as increases hole-engaging strength by permitting the aforementioned force to be maximized.

Two substantially identical outer chocks 16 and 17 are preferably provided to be azimuthally symmetrically disposed about the longitudinal axis "L" such as shown in FIG. 2, wherein the azimuthal spacing between the outer chocks is 180 degrees, so that the two chocks are disposed diametrically apart from one another. Preferably, the two chocks are disposed equal radial distances "r" from the axis "L" as shown to maximize the symmetry desired for engaging a cylindrical hole of a homogeneous material. Additional chocks may be provided for additional hole-engaging strength at additional cost. Where additional outer chocks are provided, these are also preferably spaced apart azimuthally symmetrically about the axis "L," e.g., 120 degree azimuthal spacing would preferably be employed for three outer chocks.

Azimuthal and radial symmetry of the chocks with respect to the longitudinal axis "L" each contribute to providing optimum holding strength in a cylindrical bore-hole in a homogeneous material; however, non-symmetric arrangements may be advantageous when the bore-hole is asymmetric or is bored into non-homogeneous material. Both the azimuthally symmetric disposition of the chocks and the rotationally symmetric form of the chock surfaces 13, 16a and 17a also contribute to achieving maximum robustness to relative rotation of the chocks about the longitudinal axis.

A loop 30 is provided at a proximal end of the cable 12 providing a hand-hold for a user of the expansion bolt 10, and a means for moving the cable with respect to the collar 20. A compression spring 32 is provided between the loop 30 and the collar 20, to bias the device into its expanded configuration. The compression spring is believed to provide outstanding advantages. Most importantly, it is believed that the constant force exerted by the spring on the outer chocks to urge the outer chocks into the hole with respect to the loop 30 protects against small amounts of slippage out of the hole that may otherwise occur as a result of the surface of the hole crumbling or deforming in response to the load applied to the loop 30. Even very small amounts of slippage may lead to a catastrophic loss of grip with potentially very serious consequences. In addition, the spring provides the outstanding convenience of urging the outer chocks into the hole with single-handed operation of the expansion bolt. With the spring 32 in place and the expansion bolt grasped in one hand like a syringe, e.g., the index and middle fingers are positioned on the collar 20 (at "$A_1$" and "$A_2$", respectively, in FIG. 1) and the thumb in the loop 30 (at "B" in FIG. 1), the collar can be pulled back against the spring bias for inserting the expansion bolt in to the hole and simply released for chocking the expansion bolt snugly into the hole.

The spring 32 has a spring constant of at least 3 pounds per foot, and preferably in the range of about 4–7 pounds per foot.

The use of at least two outer chocks 16 and 17 along with the center chock 14 provides an outstanding advantage of the invention. Particularly, the center chock does not come into contact with the internal surfaces of the hole in which the expansion bolt is engaged. This distributes the force exerted between the center and outer chocks over the outer surface area of the outer chocks, and this force is in turn applied to the inner surfaces of the hole with a much reduced stress. This is particularly important when installing the expansion bolt in concrete, which is while strong in compression, is brittle and easily fractured by tensile stress, or asphalt, which is relatively weak. Further, the use of a centralized chock disposed substantially along the elongate axis of the hole and at least two outer chocks distributes the stress more symmetrically and therefore uniformly over the internal surface of the hole, reducing the potential for creating regions of relative overstress. These outstanding advantages open the door to a number of new applications for the expansion bolt, which have been recognized the present inventors.

As one of these applications, an emergency or temporary tent may be erected and anchored to a concrete or asphalt surface with the expansion bolt of the present invention. In the construction industry, the expansion bolt 10 may be used by drilling holes in structures as the need arises to provide a harness point for fall protection. The expansion bolt may be placed precisely where it is needed and removed immediately upon completion of the task so that it is not available for uncontrolled subsequent use by others. For moving large objects such as boulders, a single hole drilled in the object may provide a sufficient anchor. In that regard, the present inventors have constructed an expansion bolt according to the present invention with a 20 ton holding strength.

Emergency workers may drill holes in structures where needed to employ the expansion bolt 10 for anchoring ladders, hoists, or other structures or devices that must be deployed quickly and efficiently under difficult conditions. The expansion bolt 10 may be used in many different urban building materials, such as brick, concrete and even wood.

There are many other possibilities for using the expansion bolt 10 as a result of its outstanding features. Mentioned above are some uses that provide for quick assembly and disassembly. However, more permanent installations of the expansion bolt 10 may also be used due to its outstanding strength and versatility. Some examples are retrofitting bridges and other structures with tying cables to increase earthquake resistance, and tying one or more large objects together.

Figure 3:
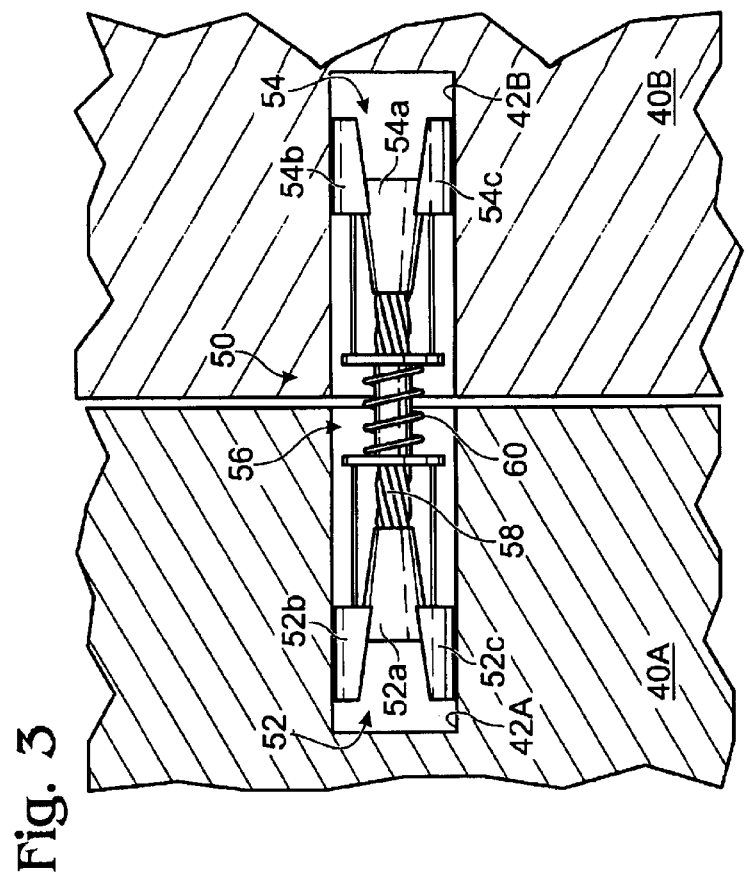
FIG. 3 is a double-ended version of the expansion bolt of FIG. 1, shown coupling two panels together.

As an example of the latter, a double-ended version 50 of the expansion bolt 10, such as shown in FIG. 3, can be sandwiched between two structures 40A and 40B for anchoring the structures together. The double-ended expansion bolt 50 has one head 52, which includes a center chock 52a, and two outer chocks 52b and 52c, that is inserted into a hole 42A. The bolt 50 has another head 54, which includes a center chock 54a, and two outer chocks 54b and 54c, that is inserted into a corresponding hole 42B in the object 40B. In one embodiment of the expansion bolt 50, the outer chocks for both heads are tied together by a coupler 56, and a cable 58 connects the center chocks of each head.

To hold the two objects together, the cable 58 must be tensioned with respect to the position of the outer chocks 52b, c and 54b, c. As one means for providing this tension, the coupler 56 may be linearly expandable and include a compression spring 60 to exert a force tending to force the outer chocks for each head apart from one another. This force is communicated to the cable 58 through the ramping surfaces of the chocks. The objects 40A and 40B will be held together by friction between the interior surface of the hole and the outer surfaces of the outer chocks, which develops in response to the force exerted by the spring. To illustrate a fully equivalent means for providing the aforementioned tension, the coupler 56 may be provided so that it is not linearly expandable while the cable is provided with a tension spring for linearly contracting the cable.

Figure 4:
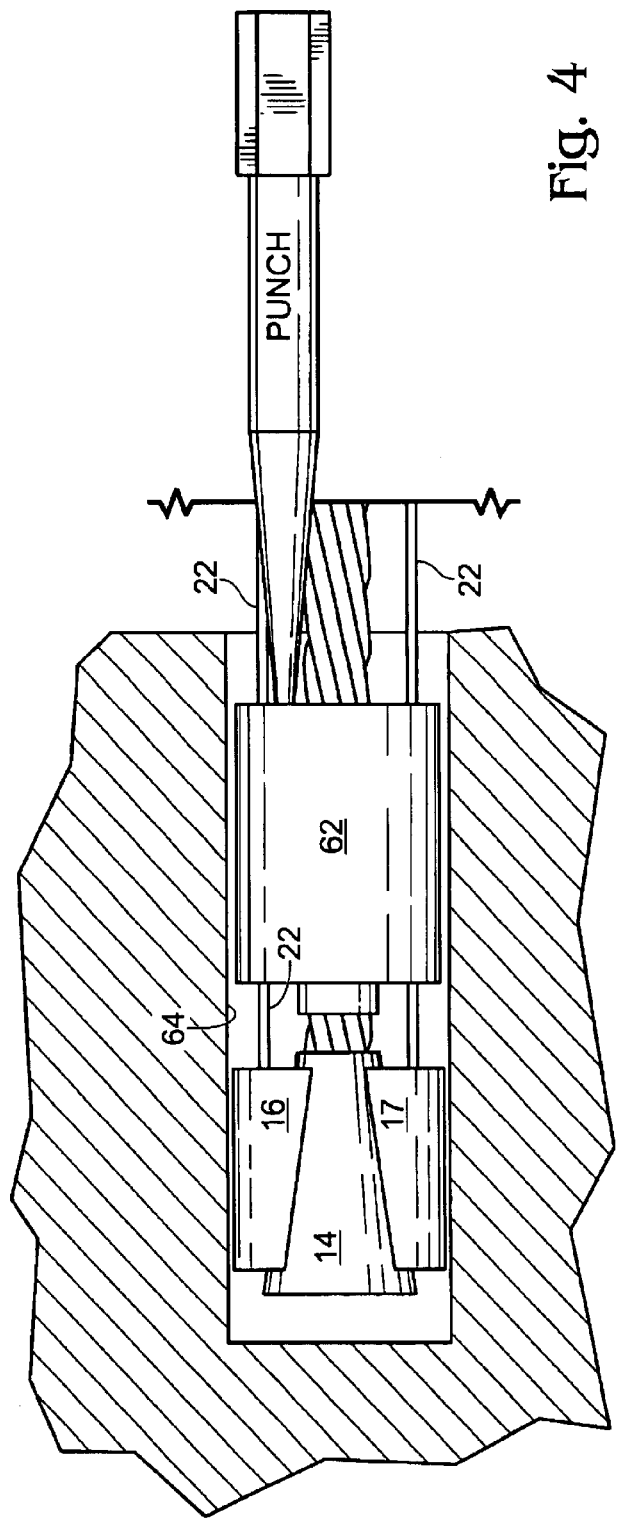
FIG. 4 is a cross-section of a second embodiment of an expansion bolt according to the present invention shown inside a hole.

Turning to FIG. 4, a second embodiment 60 of an expansion bolt according to the present invention is shown. The expansion bolt 60 provides a "cleaning bushing" 62 through which the control cables or rods 22 are slidably passed. The cleaning bushing 62 may be used to apply force to the center chock 14 to loosen the grip applied by the expansion bolt to the hole 64 in which it is inserted, for removing the expansion bolt after use. For example, a hammer (not shown) may be used to strike the cleaning bushing, or such a hammering force may be applied through use of a punch as shown, to force the center chock 14 away from the outer chocks 16 and 17, allowing the outer chocks to move radially inwardly and relax the grip of the expansion bolt so that it can be pulled out of the hole.

It is to be recognized that, while a particular expansion bolt has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

What is claimed is:

1. An expansion bolt for anchoring to a substantially cylindrical hole defining a cylindrical axis, comprising:

a plurality of outer chocks having substantially cylindrically curved outer surfaces for making contact with the inner surface of the hole, and corresponding proximal and distal ends, said distal ends for insertion into the hole;

an inner chock having an outer surface, and distal and proximal ends corresponding to said distal and proximal ends of said outer chocks, said outer surface of said inner chock being convexly curved about the cylindrical axis and being tapered radially inwardly along the cylindrical axis in the direction toward said proximal end of said inner chock, said outer chocks having complementary curved inner surfaces on which said outer surface of said inner chock is slidingly disposed for relative movement of said inner chock with respect to said outer chocks along the cylindrical axis;

a collar member supporting a plurality of flexible members for attaching respectively to said outer chocks so as to support said outer chocks for flexible axial and radial expansion thereof with respect to said inner chock; and a spring member for bearing on said collar member to force said plurality of flexible members to move in relation to said inner chock so that said proximal ends of said outer chocks are disposed toward said distal end of said inner chock along the cylindrical axis of the hole.

2. The expansion bolt of claim 1, wherein there are two of said outer chocks disposed opposite one another.

3. The expansion bolt of claim 1, wherein said spring member includes a coil spring that bears on said collar member 4. The expansion bolt of claim 1, wherein said outer surface of said inner chock is frustoconical.

5. The expansion bolt of claim 4, wherein said spring member includes a coil spring that bears on said collar member 6. An expansion bolt set for joining a first object to a second object having respective substantially cylindrical holes therein, comprising:

a first plurality of outer chocks having substantially cylindrically curved outer surfaces for making contact with the inner surface of a hole in the first object;

a first inner chock having a curved outer surface, said first outer chocks having complementarity curved inner surfaces on which said outer surface of said first inner chock is slidingly disposed for relative movement of said first inner chock with respect to said first outer chocks along the cylindrical axis of the hole;

a second plurality of outer chocks having substantially cylindrically curved outer surfaces for making contact with the inner surface of a hole in the second object;

a second inner chock having a curved outer surface, said second outer chocks having complementary curved inner surfaces on which said outer surface of said second inner chock is slidingly disposed for relative movement of said second inner chock with respect to said second outer chocks along the cylindrical axis of the hole in the second object;

a flexible cable connecting said first and second inner chocks a coupler connected to said flexible cable for forcing said first outer chocks apart from said second outer chocks to hold said first and second objects together.

7. The expansion bolt set of claim 6, wherein said outer chocks and said inner chocks have respective corresponding proximal and distal ends, said distal ends of said outer chocks for insertion into the respective holes wherein said outer surfaces of said inner chocks are convexly curved in the radial direction with respect to the respective cylindrical axes and are tapered radially inwardly along the respective cylindrical axes in the direction toward the respective proximal ends.

8. The expansion bolt set of claim 7, wherein said outer surfaces of said inner chocks are frustoconical.

9. The expansion bolt set of claim 8, wherein said coupler includes first and second collar members for supporting, respectively, said first and second outer chocks for flexible radial expansion thereof with respect to the respective said inner chocks, and a coil spring bearing on said first and second collar members for biasing said collar members away from one another.

10. The expansion bolt set of claim 7, wherein said coupler includes first and second collar members for supporting, respectively, said first and second outer chocks for flexible radial expansion thereof with respect to the respective said inner chocks, and a coil spring bearing on said first and second collar members for biasing said collar members away from one another.

11. The expansion bolt set of claim 6, wherein said coupler includes first and second collar members for supporting, respectively, said first and second outer chocks for flexible radial expansion thereof with respect to the respective said inner chocks, and a coil spring bearing on said first and second collar members for biasing said collar members away from one another.

* * * * *

UNITED STATES PATENT AND TRADEMARK OFFICE
CERTIFICATE OF CORRECTION

PATENT NO. : 6,729,821 B2
DATED : May 4, 2004
INVENTOR(S) : Karl Guthrie and Joseph Schwartz It is certified that error appears in the above-identified patent and that said Letters Patent is hereby corrected as shown below:

Column 7,
Lines 30 and 35, delete "member" and change to -- member. --
Line 43, delete "complementarity" and change to -- complementary --.

Column 8,
Line 18, delete "holes wherein" and change to -- holes, wherein --.

Signed and Sealed this

Eighteenth Day of January, 2005

JON W. DUDAS
*Director of the United States Patent and Trademark Office*